Jan. 28, 1969  H. M. POLLACK  3,424,010
ROTATING GYROSCOPE REFERENCE SYSTEM
Filed Dec. 8, 1966
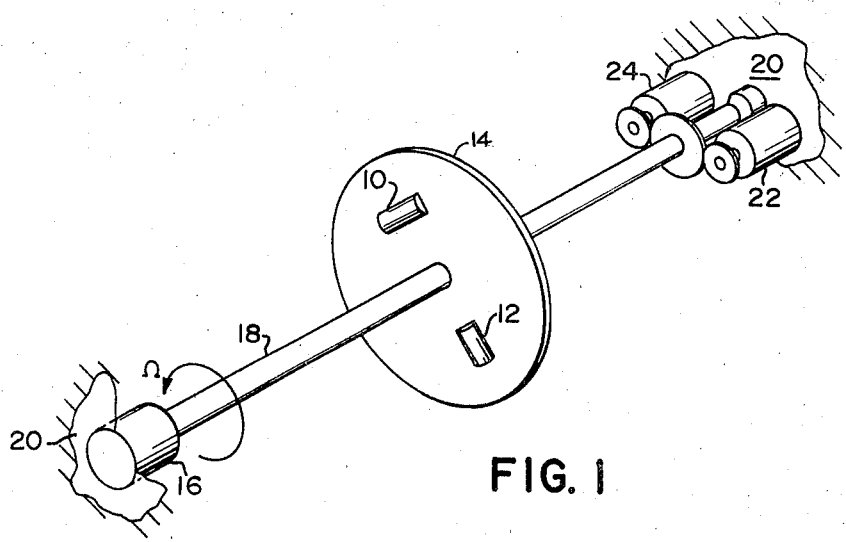
FIG. 1
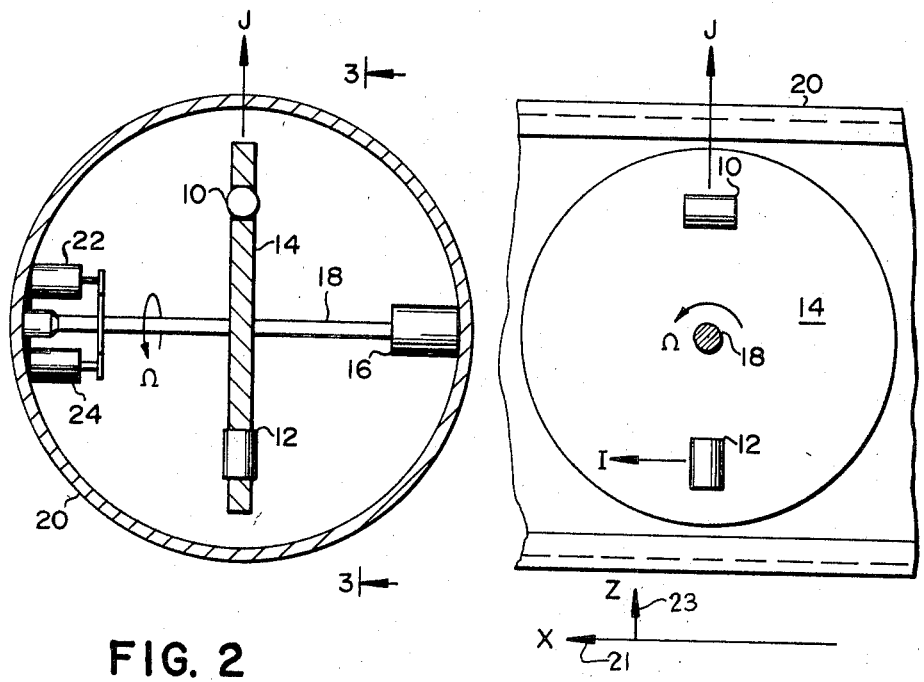
FIG. 2
FIG. 3
INVENTOR.
HOWARD M. POLLACK
BY
Constantine A. Michalos
ATTORNEY

United States Patent Office 3,424,010
Patented Jan. 28, 1969

3,424,010
ROTATING GYROSCOPE REFERENCE SYSTEM
Howard Merrill Pollack, Teaneck, N.J., assignor to General Precision Systems Inc., a corporation of Delaware
Filed Dec. 8, 1966, Ser. No. 600,162
U.S. Cl. 74—5.34    5 Claims
Int. Cl. G01c *19/28*; G01p *9/02*; B64c *17/06*

ABSTRACT OF THE DISCLOSURE

This invention provides for sensing the angular rate of a vehicle by the use of two gyroscopes mounted on a rotating wheel in such a manner that the input axes of these gyroscopes are nominally in the plane of rotation of the wheel which causes the sensed rates to be modulated at the angular velocity of the rotating wheel. The use of such instrumentation would substantially eliminate errors such as those caused by acceleration, drifts and misalignments.

---

This invention relates to the sensing of angular rates of a vehicle, and more particularly to the sensing of angular rates of a vehicle by using gyroscopes and instrumentation suitable for the generation of useful information regarding the angular motion of the vehicle.

In general gyroscopic instruments may be used to supply angular rate and attitude information for purposes of vehicle stabilization and control, as well as for measurement purposes. The use of such instrumentation is limited by the inherent drift characteristics of gyroscopes in that an indication of angular motion will exist with no angular motion present. Conversely during angular motion the drift characteristic introduces an error in sensing the angular motion. The angular drift is of such a nature that it increases in amplitude as time progresses and eventually the initial frame of reference or a new one, must be established by external means.

Heretofore, high precision gyroscopes with complex gimbals were required for relating quantities measured in body coordinates or other coordinate systems such as inertial coordinates. Other means of sensing angular rates required pre-flight calibration or some means of sensing in-flight angular velocity.

Therefore an object of this invention is to provide for a gyroscopic instrument with ancillary equipment which allows the discrimination of drift and angular rate thereby providing a precision rate measurement capability, which is not time dependent and thereby precluding the need for frequent reinitialization.

Another object of the invention is to provide for a precision angular rate reference during the period of time in which temperature stabilization of the gyroscopes is taking place.

A further object of the invention is to provide for the use of lower quality gyroscopes, such as gyroscopes having high drift characteristics, and still provide precision rate information.

A further object of this invention is to provide for a strapdown precision instrumentation measuring the angular rates of a vehicle in terms of body coordinates which may utilize lower quality gyroscopes with no complex gimbal structure and which instrumentation may perform this operation at a continuous basis while the vehicle is in flight.

Other objects and many additional advantages will be more readily understood by those skilled in the art after a detailed consideration of the following specification taken with the accompanying drawings wherein:

FIG. 1 is a schematic prospective view of the mechanical components used in a preferred embodiment of this invention;

FIG. 2 is a front elevational view of the mechanical components used in this invention as it may be located in a vehicle;

FIG. 3 is a side view of the invention taken substantially along line 3—3 of FIGURE 2;

Figure 4:
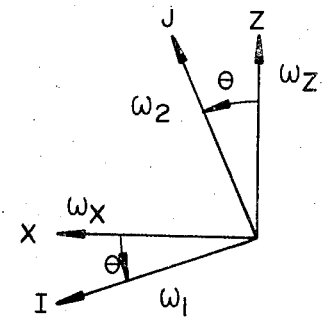
FIG. 4 is a vector diagram indicating the angular rates sensed by the gyroscopes.

Referring to the general arrangement of the mechanical instrumentation shown in FIGURES 1 to 3, two gyroscopes 10 and 12 either of the mechanically restrained rate, or the rate integrating variety are mounted to a rotating structure or wheel 14. The wheel or structure 14 is rotated at angular speed $\Omega$ by a torque motor 16 through a shaft 18 which in turn is stabilized by being mounted on a rigid structure or vehicle 20 which is traveling in the direction shown by arrow 21 of FIGURE 3. It should be noted that the angular rate $\Omega$ of the structure 14 is in an order of magnitude greater than the expected maneuver rates of the vehicle 20. Resolvers 22 and 24 are also mounted on vehicle 20 in operative connection with the shaft 18 to sense the angle of rotation and provide proper vector resolution of the gyroscopic output signals so as to relate them to vehicle body axes X and Z as shown in FIGURE 3 by arrows 21 and 23.

As shown in FIGURE 3, the gyroscopes 10 and 12 are mounted on the structure 14 in such a manner that the input axes J and I of gyroscopes 10 and 12 are nominally in the plane of rotation. This action causes the sensed rates to be modulated at the angular velocity of the rotating structure 14.

The effect of the gyro rotation is shown by the geometry of FIGURE 4 wherein the vehicle body axes are denoted by X and Z, I and J are the input axes of gyroscopes 10 and 12 respectively, and the angle $\theta$ representing angular displacement between the gyroscope frame defined by I–J and the body axis frame of the vehicle defined by X–Z. By simple vector resolution the gyro outputs $\omega_1$ and $\omega_2$ for body rates $\omega_X$ and $\omega_Z$ are given by:

(1) $\omega_1 = \omega_X \cos\theta - \omega_Z \sin\theta$
(2) $\omega_2 = \omega_X \sin\theta + \omega_Z \cos\theta$ neglecting drift and error terms.

In actual practice, the gyro outputs would be comprised of not only components of the body rates, but also of restraint drift, acceleration-sensitive errors and an error caused by misalignment of the gyro input axes picking up a component of the angular velocity of the rotating structure 14 as well as the random drift terms. This is expressed by the Equations 3 and 4.

(3) $\omega_1 = \omega_X \cos\theta - \omega_Z \sin\theta + \Omega\alpha + \omega_{1R} + \omega_{1g} + \omega_{1D}$
(4) $\omega_2 = \omega_X \sin\theta + \omega_Z \cos\theta + \Omega\beta + \omega_{2R} + \omega_{2g} + \omega_{2D}$ where $\alpha$ and $\beta$ are small angular misalignments of the gyro input axes, $\Omega$ is the angular rate of the rotating structure 14. $\omega_{1R}$ and $\omega_{2R}$ are restraint drifts, $\omega_{1g}$ and $\omega_{2g}$ are acceleration-sensitive drifts and $\omega_{1D}$ and $\omega_{2D}$ are random drifts.

Figure 5:
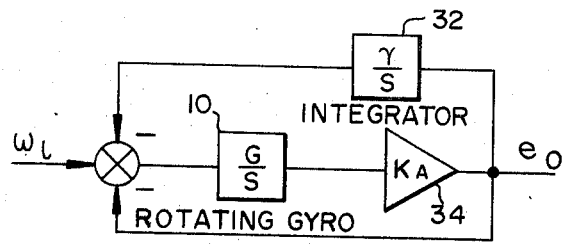
FIG. 5 is a block diagram showing partial instrumentation of the invention; and, FIG. 6 is a block diagram indicating a more complete instrumentation of the mathematical characteristics of this invention.

Considering the instrumentation of FIGURE 5, G is gyroscope gain in $$\left(\frac{\text{Radian}}{\text{Radian/Sec.}}\right)$$

$\gamma$ is the gain asociated with the feedback path integrator 32 in (volt/sec.), $K_A$ is the gain of a high gain amplifier 34 in (volt/radian) and S is the Laplace operator.

In the operation of the instrumentation shown in FIGURE 5, it should be noted that both the high gain amplifier 34 and the integrator 32 are fed back to the gyro torquer wherein $\omega_i$ is the total rate sensed by the gyro. Neglecting the acceleration-sensitive drift and the random drift, Equation 3 can be represented as a combination of a sinusoidal and a step function.

(5) $\quad \omega_i = \omega \sin \Omega t + \Omega \gamma + \omega_{iR}$ where $\omega$ is a constant body rate, and $\theta = \Omega t$.

The transfer function described by the instrumentation of FIGURE 5 is (6) $\quad \dfrac{e_o(S)}{\omega_i} = \dfrac{GK_A S}{S^2 + GK_A S + GK_A \gamma}$ The response to the input function of Equation 5 is given (7) $\quad e_o(S) = K_A G(\Omega \alpha + \omega_R) \left\{ \dfrac{S^2 + \left(\dfrac{\omega \Omega}{\Omega \alpha + \omega_R}\right) S + \Omega^2}{(S^2 + \Omega^2)(S+\epsilon)(S+K_A G - \epsilon)} \right\}$ where $\epsilon$ is defined by:

$$\epsilon \triangleq \dfrac{K_A G}{2} - \sqrt{\dfrac{K_A^2 G^2}{4} - K_A G \gamma}$$

The values of the gyro gain, amplifier gain, and the integration gain are chosen so that $\epsilon$ is a positive, non zero number.

Using a table of inverse Laplace transforms (for example, Gardner and Barnes, "Transients in Linear Systems" page 341, Formula 1.225) the time solution is found to be:

(8) 
$$e_o(t) = K_A G(\Omega \alpha + \omega_R) \left\{ \dfrac{(\epsilon^2 + \Omega^2) - \left(\dfrac{\omega \Omega}{\Omega \alpha + \omega_R}\right)\epsilon}{(\epsilon^2 + \Omega^2) K_A G} e^{-\epsilon t} \right.$$
$$- \dfrac{(K_A G + \epsilon)^2 + \Omega^2 - \left(\dfrac{\omega \Omega}{\Omega \alpha + \omega_R}\right)(K_A G + \epsilon)}{K_A G [(K_A G + \epsilon)^2 + \Omega^2]} e^{-(K_A G - \epsilon)t}$$
$$\left. + \dfrac{\omega \Omega \sin(\Omega t + \phi)}{(\Omega \alpha + \omega_R)\sqrt{[(K_A G + \epsilon)^2 + \Omega^2][\epsilon^2 + \Omega^2]}} \right\}$$

where $\theta$ is given by:

$$\phi = 90 - \tan^{-1} \dfrac{\Omega}{\epsilon} - \tan^{-1} \dfrac{\Omega}{K_A G + \epsilon}$$

Equation 8 is of interest in that it shows that cross coupling and non acceleration-sensitive drift terms are attenuated with time so that in the steady-state, the input body rate ($\omega$) appears at the output as a modulated voltage. Choosing component values so that:

$$K_A G > \Omega > \epsilon$$

the steady-state output voltage is conveniently given by:

$$e_o(t) = \omega \sin(\Omega t + \phi) = \omega \sin(\theta + \phi)$$

This means that the instrumentation described will faithfully measure the body rates as modulated by the rotating wheel and they will appear as an output voltage at the modulating frequency. In addition, all steady drift terms, of a direct current nature, will be biased out by the integrator and will not corrupt the output signal.

Given the body rates and drift terms defined by Equations 3 and 4 we get $$e_{o1}(t) = \omega_X \cos(\theta+\phi) - \omega_Z \sin(\theta+\phi) + \omega_{1g} + \omega_{1D}$$

and $$e_{o2}(t) = \omega_X \sin(\theta+\phi) + \omega_Z \cos(\theta+\phi) + \omega_{2g} + \omega_{2D}$$

Figure 6:
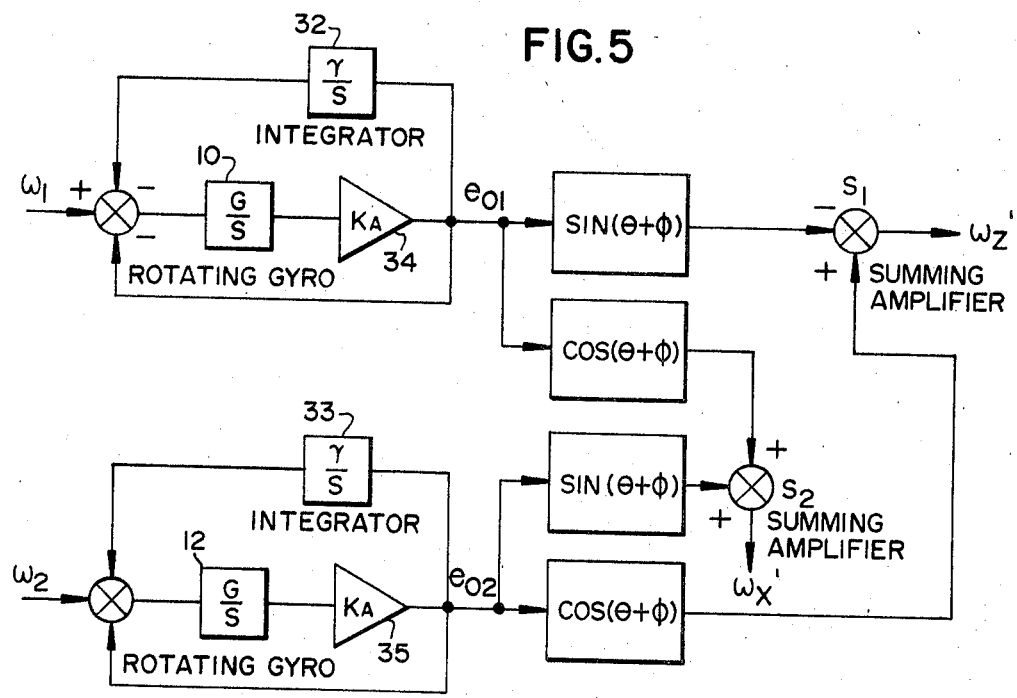

Performing the computations defined in FIGURE 6 we get $$\omega_Z' = \omega_Z + \omega_{2g} \cos(\theta+\phi) - \omega_{1g} \sin(\theta+\phi) + \omega_{1D}$$
$$\omega_X' = \omega_X + \omega_{2g} \sin(\theta+\phi) + \omega_{1g} \cos(\theta+\phi) + \omega_{2D}$$

Therefore considering the mechanization shown schematically in FIGURE 6 as a typical implementation and noting that the gyros 10 and 12 are rotating so that the total rate inputs are given by Equations 3 and 4, and multiplication by trigonometric functions may be accomplished typically by using two resolvers, the system having gyros 10 and 12, integrators 32 and 33 and amplifiers 34 and 35, the outputs of two summing amplifiers $S_1$ and $S_2$ shown in FIGURE 6 are:

$$\omega_Z' = \omega_Z + \omega_{1g} \sin(\theta+\phi) + \omega_{2g} \cos(\theta+\phi) + \omega_D$$
$$\omega_X' = \omega_X + \omega_{1g} \cos(\theta+\phi) + \omega_{2g} \sin(\theta+\phi) + \omega_D$$

It should be noted that $\omega_{1g}$ and $\omega_{2g}$ will be time-varying as a result of acceleration of the vehicle and rotation of the gyros. The form of $S_1$ and $S_2$ indicates that the periodic acceleration-sensitive terms will be averaged by the gyro rotation.

In summary, this invention discloses an angular rate sensing means that may use poor quality gyros but provide for a precision angular rate sensing means by constantly biasing the gyros. In addition, this sensing means can be used with the gyros starting cold and thereby provide for an additional advantage with quick reaction aircraft and missiles.

Furthermore, this invention may be applied for orbital flight in that the low drift characteristics allow precision orbit gyrocompassing with a convenient reference for biasing built into the system. The system would supply rate signals for damping and for Euler Angle Computations. In addition, it appears that temperature stabilization may not be critical so that heater power would be conserved in space.

In addition, the device promises to have fast reaction time, provide averaging of mass unbalance about the spin axis. The system would supply rate signals for Euler Angle Computation and damping of the airframe. It should be noted that for a three-axes reference two complete units must be used with one axis redundant. An additional advantage of this system may exist in sampling gyros at cardinal points in the event of a single gyro failing on a particular rotating structure.

While the present invention has been described in preferred embodiments, it will be obvious to those skilled in the art that various modifications can be made therein within the scope of the invention, and it is intended that the appended claims cover all such modifications.

What is claimed is:

1. An apparatus for sensing angular rates of a vehicle comprising:
    a rotating structure mounted on the vehicle and adapted to be stabilized in a predetermined relation to the axes of said vehicle,
    a shaft for supporting said rotating structure for rotation relative to said vehicle,
    a torque motor for operably rotating said structure through said shaft at an angular rate greater than the expected maneuver rate of said vehicle,
    a pair of gyroscopes mounted on said structure at each side of one axis of said vehicle respectively with the input axes of each of said gyroscopes nominally in the plane of rotation of said structure, and
    means responsive to the angular rotation of the rotating structure for providing proper vector resolution of the gyroscopes output signals so as to relate them to the vehicle body axes, and electronic means operably ascertaining the output signals and thereby generating useful information regarding the angular motion of said vehicle while minimizing misalignment errors and error produced from restraint, and acceleration-sensitive drifts.

2. The structure of claim 1 wherein said means responsive to the angular rotation of the rotating structure is a pair of resolvers operatively coupled to said shaft.

3. The structure of claim 1 wherein said gyroscopes are of the rate integrating variety having their input axes perpendicular to each other within the plane of rotation of said structure, and wherein said electronic means include a high-gain amplifier and an integrator responsive to each gyroscope and adapted to feed back signals to each said gyroscope respectively whereby said electronic means senses the total angular rate of said vehicle.

4. Apparatus for sensing the angular rates of a vehicle comprising:
   a rotating structure mounted on the vehicle and adapted to be stabilized in a predetermined relation to the axis of said vehicle,
   said rotating structure including a wheel having its axis of rotation substantially perpendicular to the longitudinal axis of said vehicle, a shaft supported on said vehicle coaxial with said wheel for rotating the latter relative to the vehicle, and a torque motor for rotating said wheel through said shaft,
   a pair of gyroscopes mounted on said wheel having their respective input axes perpendicular to each other and substantially within the plane of rotation of said wheel,
   means responsive to the rotation of said wheel for measuring the angle of rotation thereof and for continuously providing trigonometric computation for resolving the angular rate output signals of said gyroscopes so as to relate them respectively to the axes of the vehicle, and
   electronic circuit means comprising a feedback path around each said gyroscope, each said feedback path including a high-gain amplifier and an integrator respectively, and a pair of summing amplifiers whereby each of said summing amplifiers produces time varying outputs regarding the angular rates of said vehicle in relation to each of said vehicle axes, respectively.

5. The apparatus of claim 4 wherein said means for measuring the angle of rotation of said wheel comprises a pair of resolvers operatively coupled to said shaft.

References Cited
UNITED STATES PATENTS

| | | | |
|---|---|---|---|
| 3,052,129 | 9/1962 | Rocks | 74—5.34 |
| 3,127,774 | 4/1964 | Fischer et al. | 73—504 |

ROBERT A. O'LEARY, *Primary Examiner.*

WILLIAM E. WAYNER, *Assistant Examiner.*

U.S. Cl. X.R.

33—226; 73—504; 74—5; 244—79